US012069777B2

(12) United States Patent
Brenner

(10) Patent No.: US 12,069,777 B2
(45) Date of Patent: Aug. 20, 2024

(54) TERMINAL PIN

(71) Applicant: Purem GmbH, Neunkirchen (DE)

(72) Inventor: Holger Brenner, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 18/050,823

(22) Filed: Oct. 28, 2022

(65) Prior Publication Data

US 2023/0137839 A1 May 4, 2023

(30) Foreign Application Priority Data

Oct. 29, 2021 (DE) .................... 10 2021 128 241.1

(51) Int. Cl.
*H05B 3/08* (2006.01)
*F01N 3/20* (2006.01)
*F28D 21/00* (2006.01)

(52) U.S. Cl.
CPC ............ *H05B 3/08* (2013.01); *F01N 3/2013* (2013.01); *F28D 21/00* (2013.01); *F28D 2021/0029* (2013.01); *F28F 2215/04* (2013.01)

(58) Field of Classification Search
CPC .......... F01N 2240/16; F01N 2260/022; F01N 3/2013; F01N 3/2026; F28D 2021/0029; F28D 21/00; F28F 2215/04; H05B 3/08
See application file for complete search history.

(56) References Cited

U.S. PATENT DOCUMENTS

| | | | | |
|---|---|---|---|---|
| 3,887,004 A * | 6/1975 | Beck | ......................... | F28F 1/42 165/184 |
| 5,744,104 A | 4/1998 | Sakurai et al. | | |
| 2013/0011300 A1 | 1/2013 | Yoshioka et al. | | |
| 2021/0340894 A1 | 11/2021 | Neumann et al. | | |
| 2022/0136422 A1 | 5/2022 | Brueck et al. | | |

FOREIGN PATENT DOCUMENTS

| | | | |
|---|---|---|---|
| DE | 695 01 049 T2 | | 3/1998 |
| DE | 10 2019 210 368 A1 | | 1/2021 |
| EP | 2 549 074 A1 | | 1/2013 |
| EP | 3 905 845 A1 | | 11/2021 |
| JP | 2012-227277 A | | 11/2012 |
| JP | 2015-224600 A | | 12/2015 |
| JP | 2016-207368 A | | 12/2016 |
| KR | 20030084544 | * | 11/2003 |
| KR | 102104213 | * | 5/2020 |

* cited by examiner

*Primary Examiner* — Phutthiwat Wongwian
*Assistant Examiner* — Diem T Tran
(74) *Attorney, Agent, or Firm* — Walter Ottesen, P.A.

(57) ABSTRACT

A terminal pin, in particular for a terminal unit for the electrical contacting of a heating conductor of an exhaust-gas heater of an exhaust-gas system of an internal combustion engine, includes a pin body which is elongate in the direction of a pin body longitudinal axis and which has an outer connection region for the connection of a voltage supply line to the terminal pin, a cooling region, a lead-through region for the electrically insulated leadthrough of the pin body through a pin support of a terminal unit, and an inner connection region for the connection of the terminal pin to a heating conductor of an exhaust-gas heater, a cooling surface formation being provided in the cooling region.

16 Claims, 3 Drawing Sheets

TERMINAL PIN

CROSS REFERENCE TO RELATED APPLICATION

This application claims priority of German patent application no. 10 2021 128 241.1, filed Oct. 29, 2021, the entire content of which is incorporated herein by reference.

TECHNICAL FIELD

The present disclosure relates to a terminal pin that is used, for example in a terminal unit, for the electrical contacting of a heating conductor of an exhaust-gas heater of an exhaust-gas system of an internal combustion engine in order to electrically contact an exhaust-gas heater which is arranged in an exhaust-gas guiding component and around which an exhaust-gas stream, which is guided in the exhaust-gas guiding component, of an internal combustion engine can flow.

BACKGROUND

The terminal units that are used in conjunction with exhaust-gas systems of internal combustion engines comprise a terminal pin which is generally configured as a single piece and which is supported in electrically insulated fashion in a pin support and which, via the pin support, is supported on an exhaust-gas guiding component, for example an exhaust-gas pipe or an exhaust-gas-guiding housing. The terminal pin projects with an inner connection region into the internal volume of the exhaust-gas guiding component and, in the inner connection region, is connected in electrically conductive fashion, for example by soldering, to a heating conductor connection region of a heating conductor of an exhaust-gas heater of this type. In an outer connection region situated outside the exhaust-gas guiding component, the terminal pin may be attached via a cable or the like to a voltage source.

During the operation of an internal combustion engine, the various components of an exhaust-gas system warm up owing to the exhaust gas flowing therein. The operation of the exhaust-gas heater also leads to warming of the various components that conduct the heating current, in particular also of the terminal units used for the electrical connection to the heating conductor of the exhaust-gas heater or of the terminal pins of the terminal units. In this way, a cable that is attached to such a terminal pin in the outer connection region is also warmed, which cable generally has an electrically conductive core and, surrounding this, a sheath composed of electrically insulating material, for example plastics material. Excessively intense heating of the cable can lead to damage to the sheath, and in the extreme case even to ignition thereof.

SUMMARY

It is an object of the present disclosure to provide a terminal pin, in particular for a terminal unit for the electrical contacting of a heating conductor of an exhaust-gas heater of an exhaust-gas system of an internal combustion engine, in the case of which terminal pin an excessive thermal load on components that are in contact therewith is avoided.

According to the disclosure, the object is, for example, achieved via a terminal pin for the electrical contacting of a heating conductor of an exhaust-gas heater of an exhaust-gas system of an internal combustion engine, comprising a pin body which is elongate in the direction of a pin body longitudinal axis and which has:

- an outer connection region for the connection of a voltage supply line to the terminal pin,
- a cooling region,
- a leadthrough region for the electrically insulated leadthrough of the pin body through a pin support of a terminal unit,
- an inner connection region for the connection of the terminal pin to a heating conductor of an exhaust-gas heater, a cooling surface formation being provided in the cooling region.

Through the provision of the cooling surface formation, an enlarged surface is provided on the terminal pin, via which surface it is possible for heat that is absorbed or generated in the terminal pin to be released to the surroundings. Overheating of, for example, a cable that is attached to such a terminal pin can thus be prevented.

In order for such a cooling surface formation to be configured optimally irrespective of the structure of the terminal pin, it is proposed that at least a part of the cooling surface formation is formed on a cooling element that is fixed to the pin body in the cooling region.

A connection of the cooling element to the pin body that is easy to implement but nevertheless stable can be achieved for example by virtue of the cooling element being fixed to the cooling region by way of an interference fit and/or material cohesion.

A large surface available for the release of heat can be provided for example by virtue of the cooling element comprising an annular cooling element body, which surrounds the cooling region, and a multiplicity of cooling fins, which extend radially outward from the cooling element body.

For example, the cooling surface formation may comprise a multiplicity of cooling fins which follow one another with a mutual spacing in the direction of the pin body longitudinal axis and which annularly surround the pin body longitudinal axis. Alternatively or in addition, the cooling surface formation may comprise a multiplicity of cooling fins which follow one another with a mutual spacing in a circumferential direction around the pin body longitudinal axis and which preferably extend substantially in the direction of the pin body longitudinal axis.

In order to further enlarge the surface that can be closed for the release of heat, it may be provided that, in the case of at least one, preferably each cooling fin, a fin thickness increases in a radially outward direction.

If the cooling region is configured to widen radially in the direction of the leadthrough region, it is possible, if the cooling surface formation is provided on a cooling element, for the cooling element body of the cooling element to be pressed onto this radially widening cooling region.

In a further embodiment, at least a part of the cooling surface formation may be configured as an integral part of the cooling region.

In order to obtain this structure, which is integrated into the cooling region, of the cooling surface formation, it is proposed that the cooling surface formation comprises at least one groove-like indentation, preferably a multiplicity of groove-like indentations which are arranged with a mutual spacing to one another, on the cooling region.

For example, at least one groove-like indentation may be configured to preferably fully encircle the pin body longitudinal axis, and/or at least one groove-like indentation may be configured to extend preferably substantially in the direction of the pin body longitudinal axis.

In order, by means of the cooling surface formation, to also realize a shielding action in particular for the terminal pin in an insulating material which supports the pin support in electrically insulated fashion and which is for example ceramic, it is proposed that the cooling region is arranged, in the direction of the pin body longitudinal axis, between the outer connection region and the leadthrough region.

The disclosure furthermore relates to a terminal unit for the electrical contacting of a heating conductor of an exhaust-gas heater of an exhaust-gas system of an internal combustion engine, comprising a terminal pin configured according to the disclosure, which is supported in electrically insulated fashion on a pin support.

The terminal pin may be supported on the pin carrier by way of preferably ceramic insulating material.

The disclosure furthermore relates to an exhaust-gas system for an internal combustion engine, comprising an exhaust-gas heater which is arranged in an exhaust-gas guiding component and which has a heating conductor with at least one heating conductor connection region, preferably two heating conductor connection regions, a terminal unit constructed according to the disclosure being assigned to at least one heating conductor connection region, preferably each heating conductor connection region, the pin support of the terminal unit being fixed to the exhaust-gas guiding component, and the terminal pin of the terminal unit extending through an opening provided in the exhaust-gas guiding component and, in its inner connection region, being connected in electrically conductive fashion to a heating conductor connection region of the heating conductor.

BRIEF DESCRIPTION OF THE DRAWINGS

The invention will now be described with reference to the drawings wherein.

DESCRIPTION OF THE PREFERRED EMBODIMENTS

Figure 1:
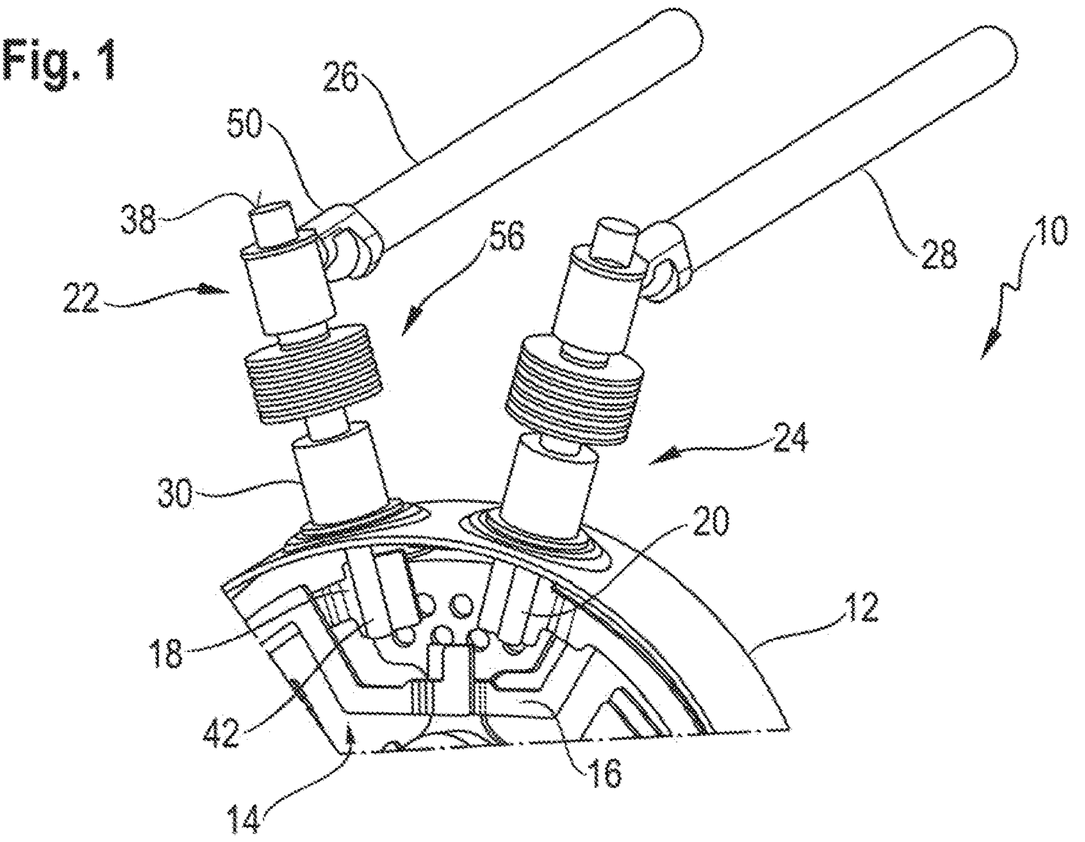
FIG. 1 shows a perspective view of a portion of an exhaust-gas system for an internal combustion engine having an exhaust-gas heater and having terminal units assigned to a heating conductor of the exhaust-gas heater.
Figure 2:
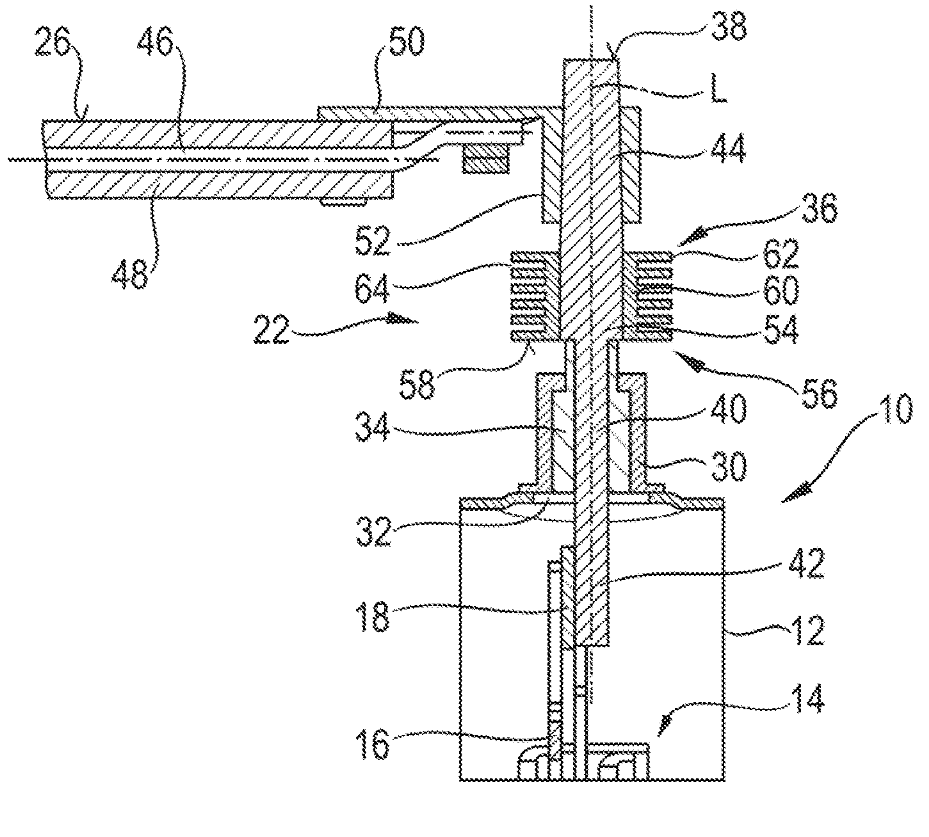
FIG. 2 shows a partial longitudinal sectional view of the portion of an exhaust-gas system as illustrated in FIG. 1.

FIGS. 1 and 2 show a portion of an exhaust-gas system, denoted generally by 10, of an internal combustion engine for a motor vehicle. The exhaust-gas system 10 comprises a tubular exhaust-gas guiding component 12, in the internal volume of which there is guided an exhaust-gas stream that is emitted by an internal combustion engine. An exhaust-gas heater 14, which is only partially illustrated, is arranged in the exhaust-gas guiding component 12. The exhaust-gas heater 14 comprises a heating conductor 16, which in the illustrated embodiment is constructed with flat material and which has two heating conductor connection regions 18, 20. In each of the heating conductor connection regions 18, 20, the heating conductor 16, which is for example assembled from multiple parts, is connected in electrically conductive fashion by means of terminal units 22, 24, which are for example structurally identical to one another, to cables 26, 28 which lead to a voltage source and which are used as voltage supply lines.

Each of the two terminal units 22, 24, which are preferably structurally identical to one another, comprises a pin support 30 which is constructed for example with metal material and which, in the region of a passage opening 32 of the exhaust-gas guiding component 12, is fixed to the outer surface thereof, for example by welding or soldering, in order to produce a gas-tight closure. By means of electrically insulating material 34, for example ceramic material, a terminal pin denoted generally by 36 is supported in the pin support 30 and electrically insulated with respect to the latter. The terminal pin 36 has a pin body 38, which is for example constructed as a single piece or optionally assembled from multiple parts and which is elongate in the direction of a pin body longitudinal axis L. In its leadthrough region 40 that extends through the pin support 30, the pin body 38 is supported on the pin support 30 by way of the electrically insulating material 34. Note that, in the embodiment illustrated in FIG. 2, it is for example possible for the leadthrough region 40 to be embedded into the electrically insulating material and thus fixed to the pin support 30. Other configurations are also conceivable, in which, with respect to the pin support 30, the leadthrough region 40 is supported on the pin support 30 via disk-like elements, which are inserted into the pin support and which are composed of the electrically insulating material, and preload elements or the like.

In its inner connection region 42 that extends in the interior of the exhaust-gas guiding component 12, the pin body 38 or the terminal pin 36 is connected in mechanically stable and electrically conductive fashion, for example by soldering or welding, to one of the heating conductor connection regions 18, 20, in the example of the terminal unit 22 illustrated in FIG. 2, the heating conductor connection region 18.

In its outer connection region 44, which is averted from the inner connection region 42 or which is situated at the other axial end of the pin body 38, the pin body 38 or the terminal pin 36 is, in the case of the terminal unit 22 illustrated in more detail in FIG. 2, connected to the cable 26. The cable 26 has a core 46, which is constructed for example with copper material or other electrically conductive material, and a sheath 48, which surrounds the core and which is composed of electrically insulating material, for example plastics material. For attachment to the terminal pin 36, the cable 26 has a terminal element 50 which engages in the manner of a clasp around the sheath 48 and which is thus fixedly connected to the latter. That end region of the core 46 which projects beyond the sheath 48 is connected in electrically conductive fashion, for example by clamping and/or soldering, to the terminal element 50. The terminal element 50 furthermore has a sleeve-like terminal region 52 which is pressed in the direction of the pin body longitudinal axis L onto the outer connection region 44 of the pin body 38 and is thus connected in electrically conductive and mechanically stable fashion thereto. For this purpose, the pin body 38 may, at least in its length portion that provides the outer connection region 44, be configured to widen radially, for example in conical fashion, in the direction of the inner connection region 42, such that a stable connection is realized by virtue of the terminal element 50 being pressed on. It would alternatively or additionally be possible for the terminal region 52 to be fixed to the outer connection region 44 by means of a fastening element, for example a nut or the like that is screwed onto the outer connection region, and/or fixed to the outer connection region 44 by material cohesion.

Between the outer connection region 44 and the lead-through region 40, the pin body 38 or the terminal pin 36 has a cooling region denoted generally by 54. In the cooling region 54, a cooling surface formation denoted generally by 56 is provided on the terminal pin 36, which cooling surface formation provides a relatively large surface for thermal interaction with the ambient air surrounding the terminal pin 36. In particular, such a cooling surface formation 56, as described in various embodiments below, is distinguished by the fact that it has a larger outer surface for thermal interaction with the ambient air than a terminal pin 36 which, in this length region, that is, the cooling region 54, is constructed with a purely cylindrical outer surface.

In the embodiment illustrated in FIGS. 1 and 2, the cooling surface formation 56 is provided on a cooling element 58 that is formed separately from the pin body 38, that is, as an independent component. The cooling element 58, which is for example constructed with metal material, has a sleeve-like cooling element body 60, which has a preferably annularly closed structure and surrounds the cooling region 54 of the pin body 38. The cooling element 58 may be fixed to the pin body 38 by way of an interference fit. For this purpose, it would for example be possible for the pin body 38 to also be configured, in its cooling region 54, to radially widen, for example conically, in the direction of the inner connection region 42. Alternatively or in addition, it is also possible for a materially cohesive connection to be provided between the pin body 38 and the cooling element body 60, for example by welding, soldering or adhesive bonding. A connection by positive locking, for example screw connection, is also possible.

The cooling element 58 has heat transfer fins 62 which extend radially outward away from the cooling element body 60 and which annularly surround the cooling element body 60 or the pin body longitudinal axis L. The annular or plate-like cooling fins 62, which follow one another in the direction of the pin body longitudinal axis L, between them form annular or groove-like indentations 64. By means of this structure with cooling fins 62 which are arranged with a spacing to one another and which follow one another in the direction of the pin body longitudinal axis L, a very large surface is provided. At this surface, heat that is generated in the pin body 38 or the terminal pin 36 by the electrical current flowing therein, or heat transferred thereto by the exhaust gas flowing around the inner connection region 42, can be released to the air surrounding the cooling element 58. Excessive warming of the cable 26 or 28 that is connected to a respective terminal unit 22 or 24 can thus be avoided.

Figure 3:
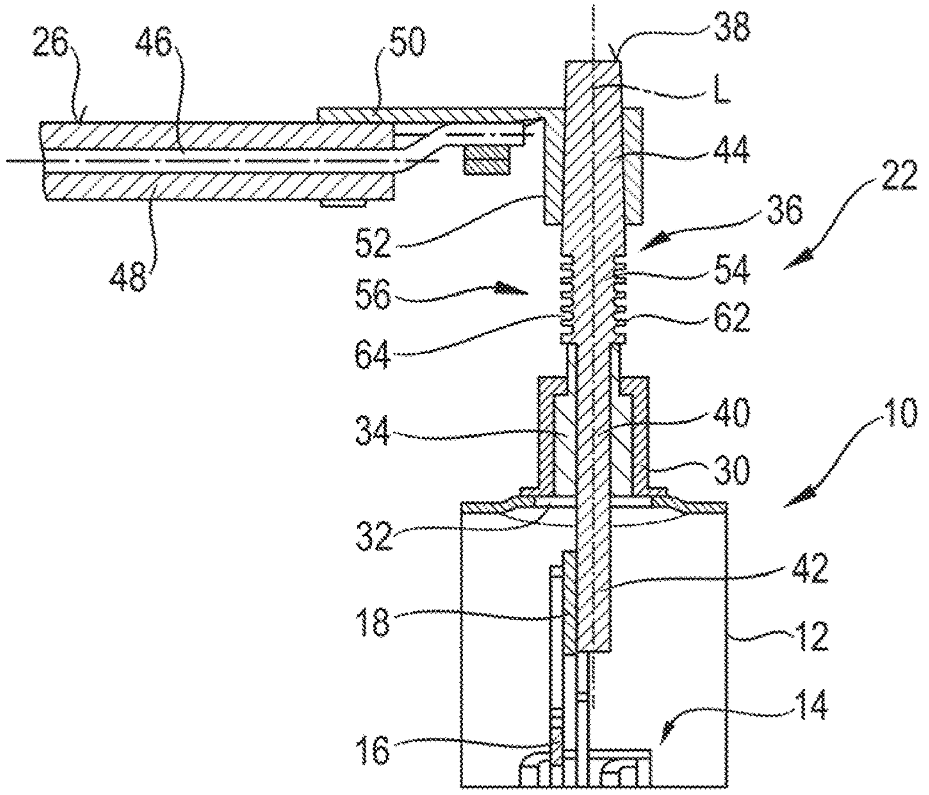
FIG. 3 shows a partial longitudinal sectional view, corresponding to FIG. 2, of an alternative form of embodiment of a terminal unit.

An alternative embodiment of such a terminal unit or of a terminal pin for same is illustrated in FIG. 3. Components that correspond in terms of construction or function to components that have been described above with reference to FIGS. 1 and 2 are denoted by the same reference designations.

In the case of the terminal unit 22 illustrated in FIG. 3, the cooling surface formation 56 forms an integral constituent part of the pin body 38 in the cooling region 54 thereof. In this embodiment, too, the cooling surface formation 56 comprises a multiplicity of cooling fins 62 which annularly surround the pin body longitudinal axis L and which have annular or groove-like indentations 64 respectively formed between them. In this embodiment, too, through the provision of the multiplicity of cooling fins 62 which follow one another in the direction of the pin body longitudinal axis L, a relatively large surface is provided at which heat can be transferred to the air flowing around the pin body 38.

Figure 4:
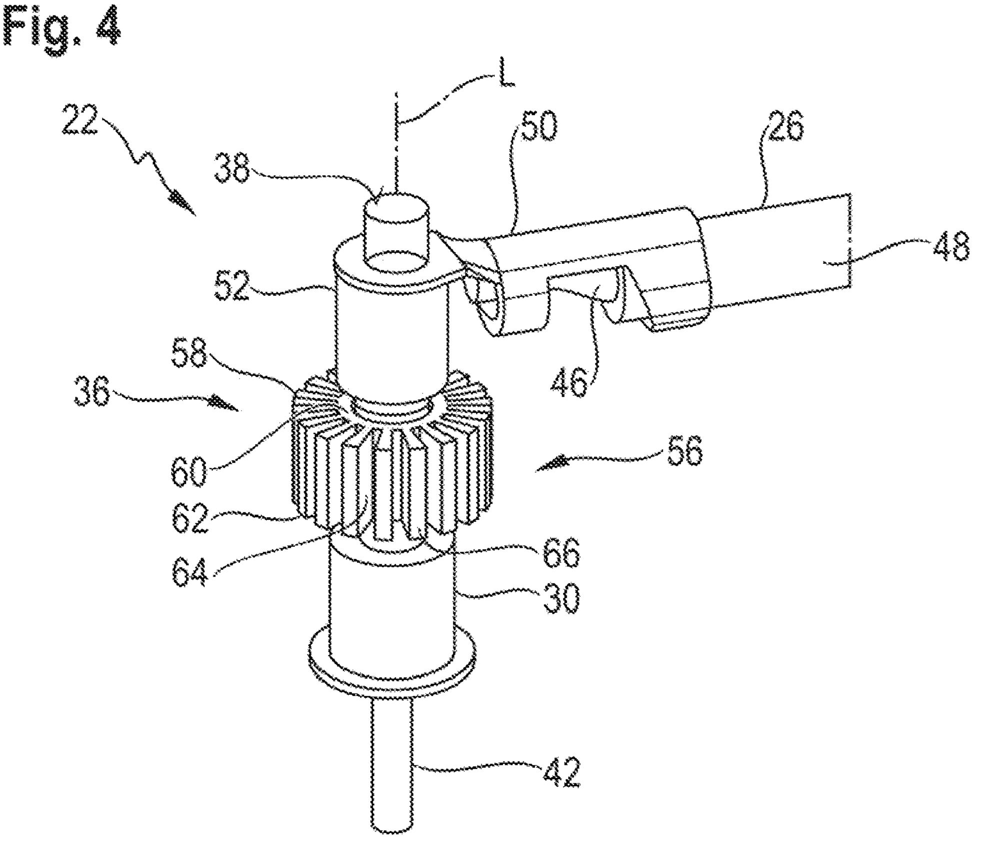
FIG. 4 shows a perspective view of an alternative form of embodiment of a terminal unit; and, FIG. 5 shows a perspective view of an alternative form of embodiment of a terminal unit.

A further modification of such a terminal unit 22 is illustrated in FIG. 4. In the case of the terminal unit 22 illustrated in FIG. 4, the cooling surface formation 56 comprises a cooling element 58 which is formed as a separate component and which has a cooling element body 60 annularly surrounding the cooling region 54 of the pin body 38. A multiplicity of cooling fins 62 extends radially outward from the cooling element body 60, such that a fan-like structure, or a structure which is stellate as seen in an axial view, of cooling fins 62, which are elongate in the direction of the pin body longitudinal axis L and which between them form intermediate spaces 64, is formed.

It can be seen in FIG. 4 that the fin thickness, that is, the dimension of the cooling fins 62 in a circumferential direction, increases from radially inside to radially outside. This has the effect that the cooling fins 62, in their radially outer end regions, provide end faces 66 of relatively large dimensions, which likewise contribute to the surface that can be utilized for the release of heat to the ambient air.

Figure 5:
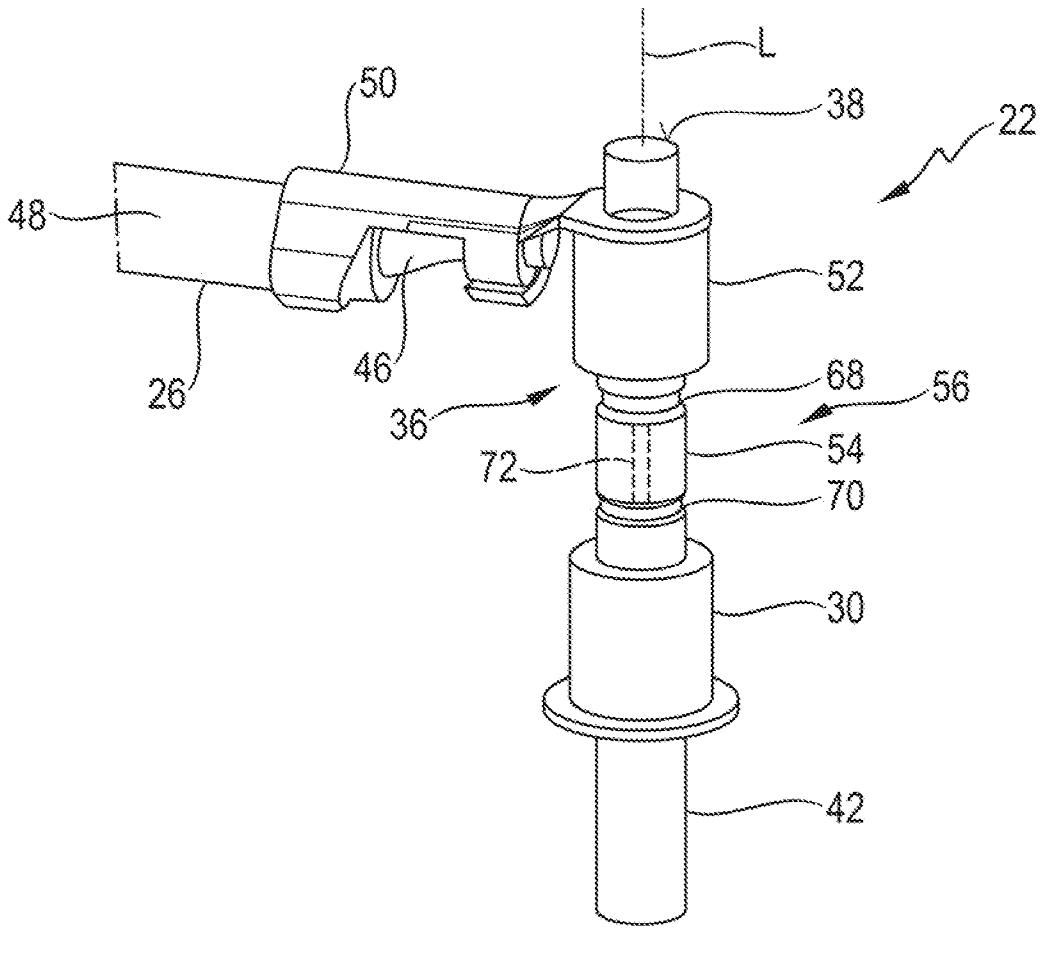

A further modified form of embodiment with a cooling surface formation 56 provided as an integral constituent part of the cooling region 54 of the pin body 38 is illustrated in FIG. 5. In this form of embodiment, the cooling surface formation 56 comprises two groove-like indentations 68, 70 which are provided with an axial spacing in the cooling region 54 and which annularly surround the pin body longitudinal axis L in preferably uninterrupted fashion. These groove-like indentations 68, 70, which are situated with a relatively large axial spacing to one another, also contribute to the enlargement of the surface of the pin body 38 in its cooling region 54, and thus to increased thermal interaction with the ambient air.

It is pointed out that, for example in the embodiment illustrated in FIG. 5, such groove-like indentations could also be formed so as to extend in the direction of the pin body longitudinal axis L. For example, it would also be possible for axially extending groove-like indentations to be formed between the two groove-like indentations 68, 70 that annularly surround the pin body longitudinal axis L, as is illustrated in FIG. 5 on the basis of the groove-like indentations 72 illustrated by dashed lines.

Through the provision of a cooling surface formation that enlarges the surface that can be utilized for thermal interaction with the ambient air, it is ensured that heat that is generated in or transferred to the terminal pin 36 is efficiently released to the outside, such that, in particular, thermal overloading of a cable that is attached to such a terminal pin 36 can be avoided. The dimensioning of the cooling surface formation, that is, for example, the number of cooling fins or groove-like indentations, can be set in a manner dependent on the expected heat quantity that is to be dissipated to the surroundings. For this purpose, the axial extent, the radial extent and/or also the number of cooling fins and/or of groove-like indentations can be selected accordingly. It is also possible in principle for the cooling fins to be configured in the form of rod-like or pin-like projections which extend from radially inside to radially outside and which may for example be arranged so as to follow one another in an annular structure in a circumferential direction around the pin body longitudinal axis and/or may be arranged so as to follow one another in a linear structure in the direction of the pin body longitudinal axis. Such structures that enlarge the surface that can be utilized for the release of heat to the surroundings may in particular also be contours that arise for manufacturing reasons, such as shaft undercuts or demolding bevels in the case of the pin body being produced as a casting.

It is also possible for different configurations to be combined with one another. For example, on one or more cooling elements, both axially extending cooling fins as illustrated in FIG. 4 and annular cooling fins as illustrated in FIG. 2 may be provided. Such a combination of different types of cooling fins or of structures that serve for the provision of a larger heat transfer surface, for example groove-like indentations, is also possible in the case of the cooling surface formation being provided as an integral constituent part of the terminal pin 36.

It is understood that the foregoing description is that of the preferred embodiments of the invention and that various changes and modifications may be made thereto without departing from the spirit and scope of the invention as defined in the appended claims.

What is claimed is:

1. A terminal pin comprising:

a pin body which is elongate in a direction of a pin body longitudinal axis (L);

said pin body having:

an outer connection region for the connection of a voltage supply line to the terminal pin;

a cooling region;

a leadthrough region for an electrically insulated leadthrough of said pin body through a pin support of a terminal unit;

an inner connection region for the connection of the terminal pin to a heating conductor of an exhaust-gas heater; and, wherein said cooling region is arranged, in the direction of the pin body longitudinal axis (L), between said outer connection region and said leadthrough region;

wherein said outer connection region widens radially in a direction toward said cooling region and said cooling region widens radially in a direction toward said leadthrough region; and wherein a cooling surface formation is disposed in said cooling region and at least a part of said cooling surface formation is formed on a cooling element fixed to said pin body in said cooling region via an interference fit.

2. The terminal pin of claim 1, wherein said cooling element is fixed to said cooling region via material cohesion.

3. The terminal pin of claim 1, wherein said cooling element includes an annular cooling element body; said annular cooling element body surrounds said cooling region; and, said cooling element further includes said multiplicity of cooling fins extending radially outward from said cooling element body.

4. The terminal pin of claim 1, wherein said cooling surface formation includes a multiplicity of cooling fins which follow one another with a mutual spacing in the direction of the pin body longitudinal axis (L) and which annularly surround the pin body longitudinal axis (L).

5. The terminal pin of claim 1, wherein a part of said cooling surface formation is an integral part of said cooling region.

6. The terminal pin of claim 5, wherein said cooling surface formation includes at least one groove-like indentation on said cooling region.

7. The terminal pin of claim 5 wherein said cooling surface formation includes a plurality of groove-like indentations arranged with a mutual spacing to one another.

8. The terminal pin of claim 6, wherein at least one of:

said at least one groove-like indentation fully encircles the pin body longitudinal axis (L); and, said at least one groove-like indentation extends in the direction of the pin body longitudinal axis (L).

9. The terminal pin of claim 1, wherein the terminal pin is for a terminal unit for the electrical contacting of a heating conductor of an exhaust-gas heater of an exhaust-gas system of an internal combustion engine.

10. The terminal pin of claim 1, wherein said cooling surface formation includes a multiplicity of cooling fins following one another in a circumferential direction around the pin body longitudinal axis (L) with a mutual spacing between circumferentially adjacent cooling fins.

11. The terminal pin of claim 10, wherein said multiplicity of cooling fins extend in the direction of the pin body longitudinal axis (L).

12. The terminal pin of claim 11, wherein at least one of said multiplicity of cooling fins has a fin thickness which increases in a radially outward direction.

13. A terminal unit for the electrical contacting of a heating conductor of an exhaust-gas heater of an exhaust-gas system of an internal combustion engine, comprising:

a pin support;

a terminal pin configured to be supported in an electrically insulated manner on said pin support;

said terminal pin having a terminal pin body which is elongate in a direction of a pin body longitudinal axis (L);

said terminal pin body having an outer connection region for the connection of a voltage supply line to the terminal pin, a cooling region, a leadthrough region for an electrically insulated leadthrough of said terminal pin body through said pin support, and an inner connection region for the connection of said terminal pin to a heating conductor of an exhaust-gas heater; and, wherein said cooling region is arranged, in the direction of the pin body longitudinal axis (L), between said outer connection region and said leadthrough region;

wherein said outer connection region widens radially in a direction toward said cooling region and said cooling region widens radially in a direction toward said leadthrough region; and wherein a cooling surface formation is disposed in said cooling region and at least a part of said cooling surface formation is formed on a cooling element fixed to said pin body in said cooling region via an interference fit.

14. The terminal unit of claim 13, wherein said terminal pin is supported on said pin support via ceramic insulating material.

15. An exhaust-gas system for an internal combustion engine, the exhaust-gas system comprising:

an exhaust-gas guiding component defining an opening;

an exhaust-gas heater arranged in said exhaust-gas guiding component;

said exhaust-gas heater having a heating conductor with at least one heating conductor connection region;

a terminal unit having a pin support and a terminal pin configured to be supported in an electrically insulated manner on said pin support;

said terminal pin having a terminal pin body which is elongate in a direction of a pin body longitudinal axis (L);

said terminal pin body having an outer connection region for the connection of a voltage supply line to the terminal pin, a cooling region, a leadthrough region for an electrically insulated leadthrough of said terminal pin body through said pin support, and an inner connection region for the connection of said terminal pin to said at least one heating conductor of said exhaust-gas heater; and, wherein said cooling region is arranged, in the direction of the pin body longitudinal axis (L), between said outer connection region and said leadthrough region;

wherein said outer connection region widens radially in a direction toward said cooling region and said cooling region widens radially in a direction toward said leadthrough region; and wherein a cooling surface formation is disposed in said cooling region and at least a part of said cooling surface formation is formed on a cooling element fixed to said pin body in said cooling region via an interference fit;

said terminal unit being assigned to said at least one heating conductor connection region;

said pin support being fixed to said exhaust-gas guiding component; and, said terminal pin body extending through said opening and, in said inner connection region, being connected in electrically conductive fashion to said heating conductor connection region of said heating conductor.

16. The exhaust gas system of claim 15, wherein said heating conductor has two heating conductor connection regions; and, said terminal unit is assigned to each of said two heating conductor connection regions.

* * * * *